(12) United States Patent
Aragon

(10) Patent No.: US 8,942,721 B1
(45) Date of Patent: Jan. 27, 2015

(54) MULTIPATH-AWARE WIRELESS DEVICE LOCATION IDENTIFIER SYSTEMS, DEVICES AND METHODS

(75) Inventor: David Aragon, Berkeley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 483 days.

(21) Appl. No.: 13/435,789

(22) Filed: Mar. 30, 2012

(51) Int. Cl.
   *H04W 24/00* (2009.01)
   *H04M 11/04* (2006.01)

(52) U.S. Cl.
   USPC ............... 455/456.1; 455/457; 455/404.1

(58) Field of Classification Search
   CPC .................................. H04W 4/00; H04J 11/00
   USPC ................ 455/456.1, 457, 404.1, 404.2
   See application file for complete search history.

(56) References Cited

U.S. PATENT DOCUMENTS

| | | | |
|---|---|---|---|
| 6,674,403 B2 | 1/2004 | Gray et al. | |
| 8,798,022 B1 * | 8/2014 | Aragon | 370/338 |
| 2010/0260083 A1 | 10/2010 | Liao et al. | |
| 2011/0143683 A1 * | 6/2011 | Sridhara et al. | 455/67.16 |

OTHER PUBLICATIONS

Co-pending U.S. Appl. No. 13/534,851, filed Mar. 30, 2012, 37 pages.
Office Action for U.S. Appl. No. 13/534,851, mailed on Jan. 2, 2014, 6 pages.
Judd, G. et al., Efficient Channel-Aware Rate Adaptation in Dynamic Environments, *MobiSys'08*, Jun. 17-20, 2008, 14 pages.
Lacage, M. et al., IEEE 802.11 Rate Adaptation: A Practical Approach, *MSWiM'04*, Oct. 406, 2004, 9 pages.

* cited by examiner

*Primary Examiner* — Tilahun B Gesesse
(74) *Attorney, Agent, or Firm* — Cooley LLP

(57) ABSTRACT

A non-transitory processor-readable medium storing code representing instructions to be executed by a processor includes code to cause the processor to receive from a wireless access point (WAP) device frequency-domain data associated with signals received at the WAP device from a wireless device during a time period. The code includes code to determine multiple frequency-domain magnitudes associated with the frequency-domain data for the time period to define a spectral magnitude signature associated with the frequency-domain data. Each frequency-domain magnitude from the multiple frequency-domain magnitudes is uniquely associated with a frequency bin from multiple mutually-exclusive frequency bins associated with the frequency domain data. The code also includes code to identify a spectral response deviation associated with the spectral magnitude signature and send a location identifier associated with a location of the wireless device based on the spectral response deviation.

20 Claims, 8 Drawing Sheets

Spectral Response Table
240

| X Coordinate | Y Coordinate | Spectral Response Deviations |
|---|---|---|
| X1 | Y1 | S1 |
| X2 | Y2 | S2 |
| X3 | Y3 | S3 |
| X4 | Y4 | S4 |
| X5 | Y5 | S5 |
| X6 | Y6 | S6 |

FIG. 7

MULTIPATH-AWARE WIRELESS DEVICE LOCATION IDENTIFIER SYSTEMS, DEVICES AND METHODS

BACKGROUND

Some embodiments described herein relate generally to systems and methods for locating a wireless device within a compute environment that lacks or has limited interior physical barriers.

Some known systems for locating wireless devices can be vulnerable to imprecision in the received signal strength indication (RSSI) measurements supplied by access point (AP) sensors communicating within the systems. A particular challenge for such systems can be locating a device within a space that lacks internal barriers, such as a convention hall or warehouse. In contrast to an office with many internal walls, attenuation of signal strength due to distance is typically relatively small in spaces that lack or have limited internal walls, so RSSI provides only a gross estimate of distance. Thus, such known systems can typically determine the room in which a wireless device is located, but can not necessarily determine the location more specifically within the room.

Also in such spaces, multipath reflections are relatively unimpeded by distance, which can lead to distorted or ambiguous measurements. A further limitation of known RSSI-based location systems is overall sparseness of information to support an output decision, because a large number (e.g., at least four) of fortuitously-placed AP sensors are typically used to produce an unambiguous location result. Additional AP sensors can be placed to increase location accuracy; the addition of AP sensors, however, can add expense to the system due to the high costs of AP sensors.

Accordingly, a need exists for devices and methods for locating a wireless device within a compute environment that lacks or has limited interior barriers, such as a conference center or warehouse, with accuracy and precision without the use of additional AP sensors.

SUMMARY

A non-transitory processor-readable medium storing code representing instructions to be executed by a processor includes code to cause the processor to receive from a wireless access point (WAP) device frequency-domain data associated with signals received at the WAP device from a wireless device during a time period. The code includes code to determine multiple frequency-domain magnitudes associated with the frequency-domain data for the time period to define a spectral magnitude signature associated with the frequency-domain data. Each frequency-domain magnitude from the multiple of frequency-domain magnitudes is uniquely associated with a frequency bin from multiple mutually-exclusive frequency bins associated with the frequency domain data. The code also includes code to identify a spectral response deviation associated with the spectral magnitude signature and send a location identifier associated with a location of the wireless device based on the spectral response deviation.

BRIEF DESCRIPTION OF THE DRAWINGS

FIG. 7 is a spectral response table associated with the spectral response appliance of FIG. 4.

DETAILED DESCRIPTION

Figure 1:
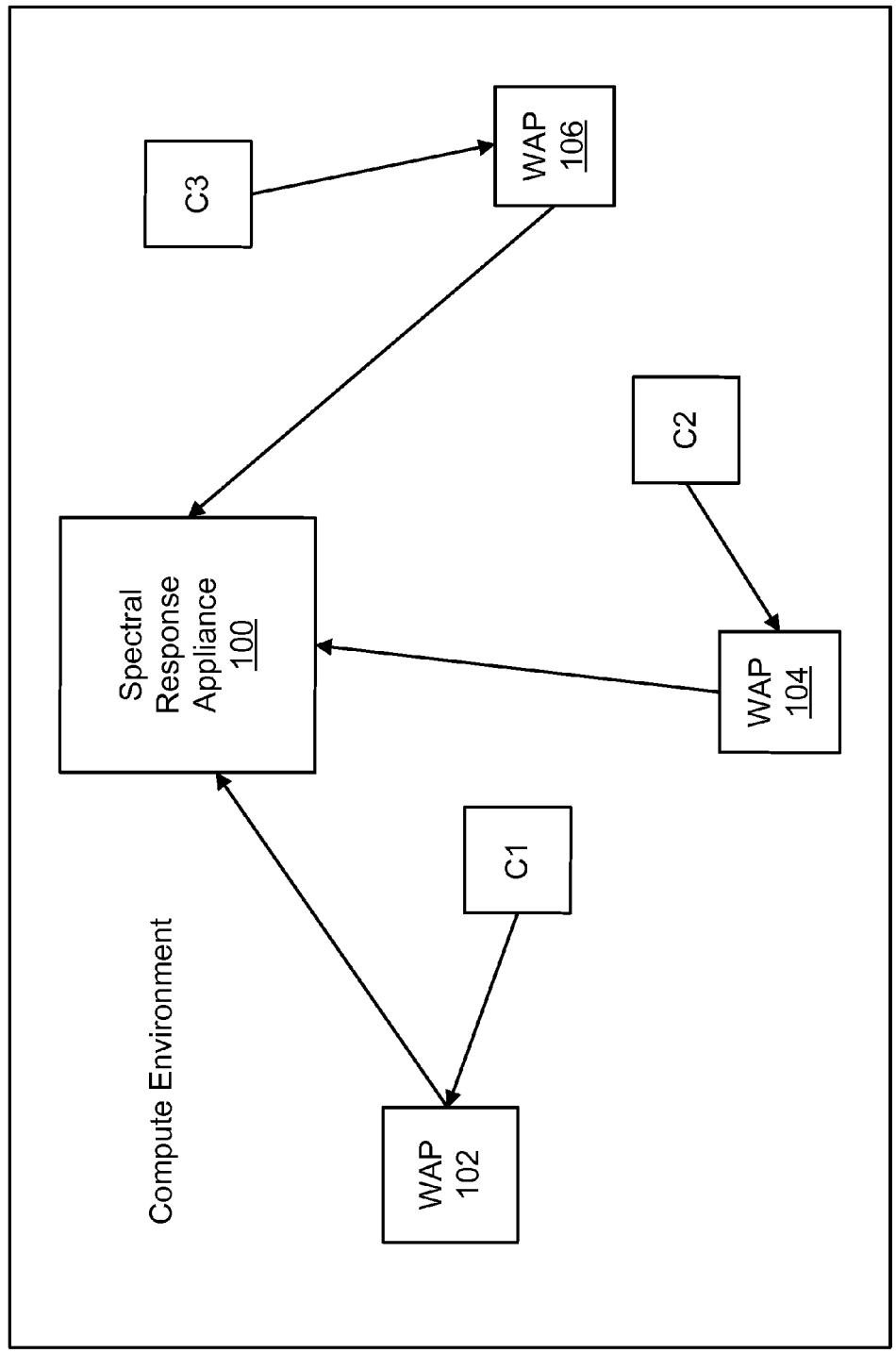
FIG. 1 is a schematic illustration of a spectral response appliance, according to an embodiment, and multiple wireless access point devices and multiple compute devices, disposed within a compute environment.

Apparatus and methods are described herein for locating a wireless device within a computer environment, and more specifically, within a compute environment that lacks or has limited interior barriers such as, for example, within a warehouse or large convention room. A spectral response appliance described herein can locate a radio frequency (RF) transmitter of a wireless device using signal strengths received at multiple wireless access point (WAP) devices or sensors, such as, for example, an orthogonal frequency division multiplexing (OFDM) receiver. The spectral response appliance can receive spectral data from the transmissions of the wireless device to derive parameters characterizing the physical transmission path, and use those parameters together with the signal strengths to provide a more precise and accurate location estimate than could be obtained by signal strengths alone.

Radio signal reflections, known as multipath distortion, can cause frequency-selective fading. This multipath distortion can be represented in the output of a fast Fourier transfer (FFT) integrated circuit of a WAP device as attenuation of some subcarriers relative to others. A WAP device typically includes an equalizer that can compensate (up to a point) for such attenuation so as to recover the digital data. The spectral response appliance described herein can use the frequency-selective fading data to determine a location of a wireless device because the frequency-selective fading data varies with the wireless device transmitter's location. The frequency-selective fading data can also vary with the location of the WAP device receiver, but typically the WAP device(s) are stationary or at a fixed location within a compute environment.

In one embodiment, the spectral response appliance can collect frequency-domain data (also referred to as frequency-selective fading data) from the WAP device after the FFT stage and prior to an equalization process, during the time period in which the WAP device is receiving a frame (e.g., a set of date over a period of time) from a wireless device. The spectral response appliance can have an accumulator that accumulates the magnitudes of each frequency bin over the duration of the incoming frame. Typically, OFDM modulation results in a random quality to the magnitude values for each subcarrier (e.g., subcarrier frequency) over time, so the outputs from the accumulator can be approximately or substantially equal by the time the frame has been entirely received. Frequency-selective fading can be indicated by deviations from this ideal of equal spectral magnitudes. A spectral feature extractor of the spectral response appliance outputs numeric values that vary with the location and depth of the spectral nulls or shadows found in the accumulator output.

The numeric values representing the spectral features can then be combined with other data describing the frame, including, for example, the transmitter address, the received signal strength indicator (RSSI) of the frame, and the time of arrival of the frame. This combined data can be used in a location system, such as, for example, a known location system such as the Trapeze LA-200E Location Appliance manufactured by Trapeze Networks that compares received inputs to previously-stored models or templates, where the comparison process would ordinarily take RSSI values as the input. The spectral features are treated essentially as additional sensor readings on the same transmitter, but received from different sensors. Because the new spectral readings are location-dependent, but in a way that is different from the location dependence of RSSI readings, the new spectral readings function as additional independent sources of input for the pattern-matching system, without the necessity of adding more WAPs.

In some embodiments, a non-transitory processor-readable medium storing code representing instructions to be executed by a processor includes code to cause the processor to receive from a WAP device frequency-domain data associated with signals received at the WAP device from a wireless device during a time period. The code includes code to determine multiple frequency-domain magnitudes associated with the frequency-domain data for the time period to define a spectral magnitude signature associated with the frequency-domain data. Each frequency-domain magnitude from the multiple frequency-domain magnitudes is uniquely associated with a frequency bin from multiple mutually-exclusive frequency bins associated with the frequency domain data. The code also includes code to identify a spectral response deviation associated with the spectral magnitude signature and send a location identifier associated with a location of the wireless device based on the spectral response deviation.

In some embodiments, an apparatus includes a spectral response appliance configured to be coupled to a WAP device that receives from a wireless device signals during a time period. The spectral response appliance is configured to receive from a FFT integrated circuit of the WAP device frequency-domain data associated with the signals received by the WAP device from the wireless device. The spectral response appliance includes a spectral response module configured to identify a spectral response deviation associated with the frequency-domain data received from the FFT integrated circuit and send an indicator based on the spectral response deviation.

As used herein, "associated with" can mean, for example, included in, physically located with, a part of, and/or operates or functions as a part of. Additionally, "associated with" can mean, for example, references, identifies, characterizes, describes, and/or sent from. For example, a frequency-domain magnitude can be associated with a frequency bin and identifies, references and/or relates to the frequency bin. Similarly, a frequency bin can be associated with a frequency-domain data and can be said to identify, reference and/or relate to the frequency-domain data.

As used in this specification, the singular forms "a," "an" and "the" include plural referents unless the context clearly dictates otherwise. Thus, for example, the term "a compute device" is intended to mean a single compute device a combination of compute devices.

FIG. 1 is a schematic illustration of a spectral response appliance according to an embodiment, coupled to and in communication with multiple WAP devices disposed within a compute environment. As shown in FIG. 1, a spectral response appliance 100 can be operatively coupled to and in communication with multiple WAP devices 102, 104 and 106 disposed within or near a compute environment. The spectral response appliance 100 can communicate with the WAP devices 102, 104, 106 with a wired or wireless connection. The compute environment can be, for example, a large room or space, such as, a warehouse or a large convention center where the space lacks or has limited interior barriers. As described above, such spaces can make it difficult to identify a location of a wireless device within the space. The spectral response appliance 100 can use data received from the WAP devices 102, 104, 106 to identify the location of a wireless device within the compute environment as described in more detail below.

The WAP devices 102, 104 and 106 can be, for example, an OFDM receiver device. Although three WAP devices are illustrated in FIG. 1, it should be understood that spectral response appliance 100 can be operatively coupled to, and communicate with, more or less WAP devices. The WAP devices 102, 104, 106 can each communicate with one or more compute devices C1, C2, C3, as shown in FIG. 1. For example, the compute devices C1, C2, C3 can send and receive signals from the WAP devices 102, 104, 106. The WAP devices 102, 104, 106 can provide communication between the multiple compute devices C1, C2, C3 and a network, such as a local area network (LAN), a wide area network WAN), or a network such as, for example, the Internet. The multiple compute devices C1, C2, C3 can be, for example, a tablet device, a netbook computer, a laptop computer, a personal digital assistant (PDA), a cellular telephone, a portable/mobile internet device and/or some other electronic communications device configured to wirelessly communicate with other devices. Although three compute devices are illustrated in FIG. 1, it should be understood that more or less compute devices can communicate with the WAP devices 102, 104, 106.

Figure 2:
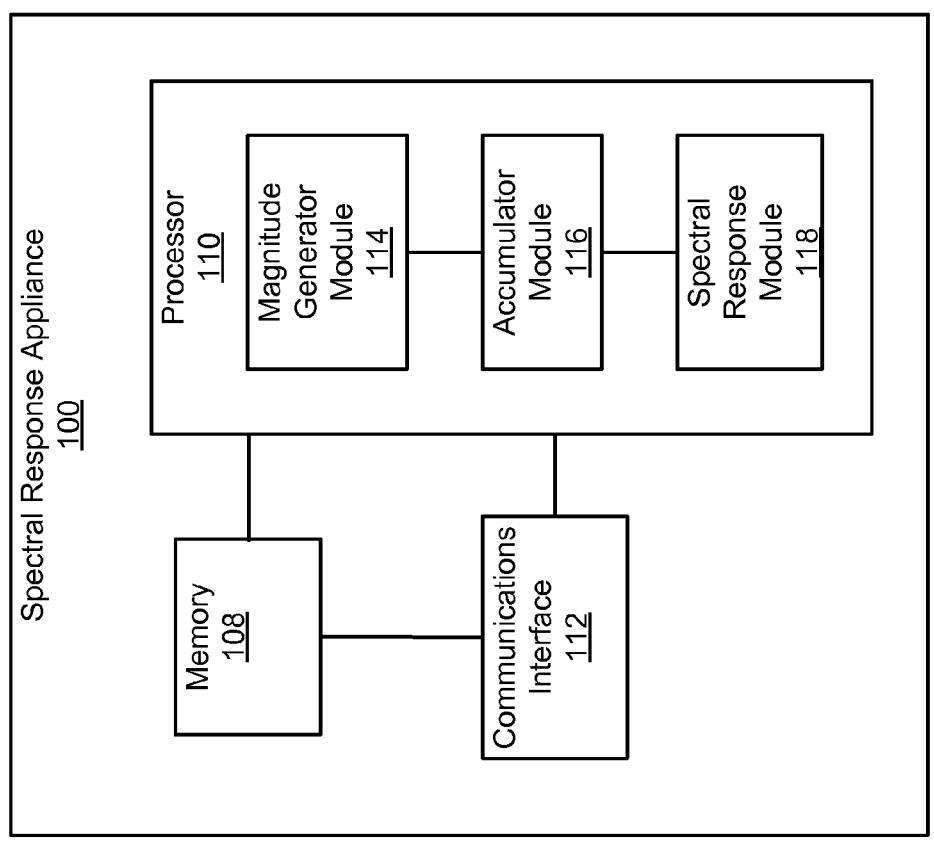
FIG. 2 is a schematic illustration of the spectral response appliance of FIG. 1.

As shown in FIG. 2, the spectral response appliance 100 (also referred to herein as "appliance") can include a processor 110, a memory 108, and a communications interface 112. The processor 110 can include a magnitude generator module 114, an accumulator module 116 and a spectral response module 118. The appliance 100 can include a combination of hardware modules and/or software modules (e.g., stored in memory and/or executing in a processor). Processor 110 can be operatively coupled to memory 108 and communications interface 112. Communications interface 112 can be one or more wired and/or wireless data connections, such as connections conforming to one or more known information exchange standards, such as wired Ethernet, wireless 802.11x ("Wi-Fi"), high-speed packet access ("HSPA"), worldwide interoperability for microwave access ("WiMAX"), wireless local area network ("WLAN"), Ultra-wideband ("UWB"), Universal Serial Bus ("USB"), Bluetooth®, infrared, Code Division Multiple Access ("CDMA"), Time Division Multiple Access ("TDMA"), Global Systems for Mobile Communications ("GSM"), Long Term Evolution ("LTE"), broadband, fiber optics, telephony, and/or the like.

Memory 108 can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

The processor 110 can be any of a variety of processors. Such processors can be implemented, for example, as hardware modules such as embedded microprocessors, Application-Specific Integrated Circuits ("ASICs"), and Programmable Logic Devices ("PLDs"). Some such processors can have multiple instruction executing units or cores. Such processors can also be implemented as one or more software modules (e.g., stored in memory and/or executing in a processor) in programming languages such as, for example, Java™, C++, C, assembly, a hardware description language, or any other suitable programming language. A processor according to some embodiments includes media and computer code (also can be referred to as code) specially designed and constructed for the specific purpose or purposes. In some embodiments, the processor 110 can support standard HTML, and software languages such as, for example, JavaScript, JavaScript Object Notation (JSON), Asynchronous JavaScript (AJAX).

In some embodiments, the processor 110 can be, for example, a single physical processor such as a general-purpose processor, an ASIC, a PLD, or a FPGA having a single processing core or a group of processing cores. Alternatively, the processor 110 can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In yet other alternatives, the processor 110 can be a group of distributed processors (e.g., computing devices with one or more physical processors) operatively coupled one to another via a separate communications network (not shown). Thus, the processor 110 can be a group of distributed processors in communication one with another via a separate communications network (not shown). In some embodiments, a processor can be a combination of such processors. For example, a processor can be a group of distributed computing devices, where each computing device includes a group of physical processors sharing a memory bus and each physical processor includes a group of processing cores.

Figure 3:
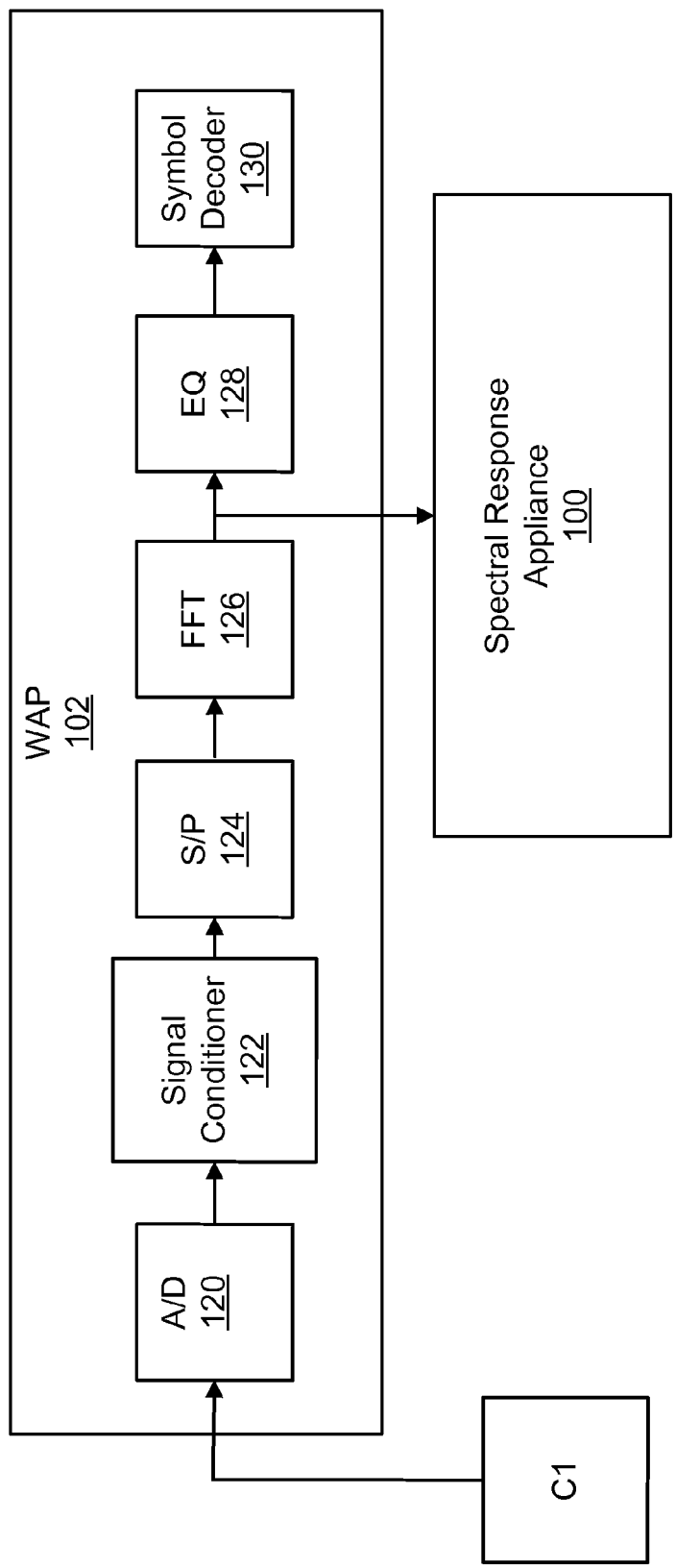
FIG. 3 is a schematic illustration of the spectral response appliance, a wireless access point device and a compute device of FIG. 1.

FIG. 3 is a system block diagram illustrating details of the WAP device 102, and the spectral response appliance 100 and compute device C1 operatively coupled to the WAP device 102. WAP device 102 can include a processor operatively coupled to a memory, and a communications interface (each not shown in FIG. 3). WAP device 102 can communicate with other WAP devices (e.g., 104, 106), and/or the appliance 100 and/or other appliances (not shown) and/or multiple compute devices (e.g., C1, C2, C3) via its communications interface. The processor and memory of WAP device 102 can be the same as or similar to the processor 110 and memory 108 described above, but without the magnitude generator 114, accumulator 116 and spectral response module 118. WAP devices 104 and 106 can also include a processor, memory and communications interface, and other components shown and described for WAP device 102. As shown in FIG. 3, the WAP device 102 also includes an analog to digital (A/D) converter 120, a signal conditioner 122, a serial to parallel (S/P) converter 124, a fast Fourier transfer (FFT) integrated circuit, an equalizer 128 and a symbol decoder 130, all of which can be implemented in the processor and/or memory.

In use, the WAP device 102 can receive signals (e.g., RF signals) from the compute device C1 (and possibly other compute devices) operating within the compute environment. As the wireless device C1 moves from a first location to a second location within compute environment, the WAP device can send data to the appliance 100 and the appliance 100 can identify a location of the wireless device C1 at a given time. Specifically, the signals received at the WAP device 102 from the wireless device C1 can be converted from analog to digital at the A/D converter 120. The signals output from the A/D converter 120 can be then processed at the signal conditioner 122. For example, the signals output from the A/D converter 120 can be synchronized and a cyclic prefix can be removed. The signals output from the signal conditioner 122 can then be converted from serial to parallel at the S/P converter 124 and passed to the FFT integrated circuit 126.

As described above, radio signal reflections, known as multipath distortion, can cause frequency-selective fading, which can be represented in the output of the FFT integrated circuit 126 as attenuation of some subcarriers relative to others. The equalizer 128 can typically compensate for such attenuation to recover the digital data and send the signal to the symbol decoder 130. Thus, the signals (i.e., frequency-domain data) received at the WAP device 102 from the compute device C1 are sent to the equalizer 128 to be equalized and then transferred to the symbol decoder 130. At the symbol decoder 130, the signals received from the equalizer 128 can be compressed and error correction coding can be added. As described in more detail below, the spectral response appliance 100 can also receive frequency-domain data (that includes the frequency-selective fading data) from the output of the FFT integrated circuit 126 prior to equalization at the equalizer 128, and use the frequency-domain data to determine a location of the compute device C1 (and possibly other compute devices, such as, e.g., C2 C3) within the compute environment. As described above, this is possible because the frequency-selective fading data included in the frequency-domain data varies with the location of the transmitter (e.g., RF transmitter) of the compute device C1. Thus, the appliance 100 can use the frequency-domain data from the FFT integrated circuit 126 to determine a location of the compute device C1 as the compute device C1 is moved within the compute environment.

The magnitude generator module 114, the accumulator module 116 and the spectral response module 118 of the appliance 100 can each be any valid combination of hardware and/or software (stored in software and/or executing on hardware) collectively configured to determine a location of a wireless device (e.g., compute device C1) within the compute environment based on the frequency-domain data received from the WAP device 102 (and WAP devices 104, 106). Specifically, frequency-domain data associated with signals received at the WAP device 102 from the compute device C1 during a time period can be received at the magnitude generator module 114. As described above, the appliance 100 receives the frequency-domain data at the output of the FFT integrated circuit 126. The magnitude generator module 114 can determine multiple frequency-domain magnitudes associated with the frequency-domain data for the time period. For example, each frequency-domain magnitude from multiple frequency-domain magnitudes can be uniquely associated with a frequency bin from multiple mutually-exclusive frequency bins associated with the frequency domain data received from the WAP device 102. The accumulator module 116 can then generate a spectral magnitude signature associated with the frequency-domain data based on the multiple frequency-domain magnitudes. For example, the accumulator module 116 can generate a table representative of a graph of magnitude versus frequency for each frequency bin associated with the frequency-domain data. The table generated by the accumulator module 116 can be stored in the memory 108 of the appliance 100. For example, the stored table can include a frequency indicator associated with each of the frequency bins from the multiple mutually-exclusive frequency bins, and a magnitude value associated with each frequency indicator from the multiple frequency indicators.

The spectral response module 118 can then identify a spectral response deviation based on the spectral magnitude signature associated with the frequency-domain data generated at the accumulator module 116. For example, as discussed above, OFDM modulation at a WAP device gives a random quality to the magnitude values of each subcarrier (also referred to as subcarrier frequency or frequency bin) over time, so the frequency-domain magnitudes from the accumulator module 116 can be approximately or substantially equal by the time the frequency-domain data has been entirely received. Frequency-selective fading as discussed above can be indicated by deviations from this ideal of equal spectral magnitudes. Thus, as used here, a spectral response deviation is synonymous with or the same as the frequency-selective fading deviation. The spectral response module 118 can use a spectral feature extractor to output numeric values that represent the location and depth of the spectral nulls or magnitude decreases as a function of frequency (also referred to herein as spectral response deviations) found in the output (e.g., the spectral response signature) of the accumulator module 116.

The spectral response deviation can then be combined with other data describing the frequency-domain data, including, for example, the transmitter address of the compute device, the received signal strength indicator (RSSI) of the frequency-domain data, and the time of arrival of the frequency-domain data. This combined data can be used by the spectral response appliance 100, which can compare the combined data to previously-stored models or templates. The spectral response appliance 100 can use this combined data rather than RSSI readings as input. The spectral response deviations can be treated essentially as additional sensor readings on the same transmitter, but received from different sensors. Because the new spectral response deviations are location-dependent, but in a way that is different from the location dependence of RSSI readings, the spectral response deviations can function as additional independent sources of input for the pattern-matching system.

Specifically, after identifying the spectral response deviation associated with the spectral response signature as described above, the spectral response module 118 can use the spectral response deviation to identify a location identifier associated with a location of the compute device C1 within the compute environment based on the spectral response deviation. For example, the location identifier can be associated with a location grid defined by the compute environment in which the compute device C1 is disposed. The location identifier can include an x-coordinate and a y-coordinate associated with the location grid defined by the compute environment. For example, the appliance 100 can generate a predefined spectral response table including multiple reference spectral response deviations and multiple location identifiers, where each of the reference spectral response deviations is associated with a location identifier.

To generate the predefined spectral response table, a reference compute device can be used. For example, a reference compute device can be moved to multiple different locations within the compute environment and communicate with (i.e., send and receive signals) the WAP devices 102, 104, 106 as described above. The appliance 100 can then determine a spectral response deviation associated with each of the multiple different locations of the reference compute device based on frequency-domain data received from the WAP devices 102, 104, 106 (as described above) when the reference compute device is located at the multiple different locations within the compute environment. The appliance 100 can then define the predefined spectral response table that includes multiple reference spectral response deviations and a location identifier (e.g., x-y coordinates) associated with each of the reference spectral response deviations for each of the different locations of the reference compute device. After generating the predefined spectral response table, when a compute device, such as compute device C1 is moved within the compute environment, the appliance 100 can use the frequency-domain data received from the WAP devices 102, 104, 106 to determine a spectral response deviation as described above. The appliance 100 can then use the predefined spectral response table to determine the location of the compute device based on the identified spectral response deviation.

Figure 4:
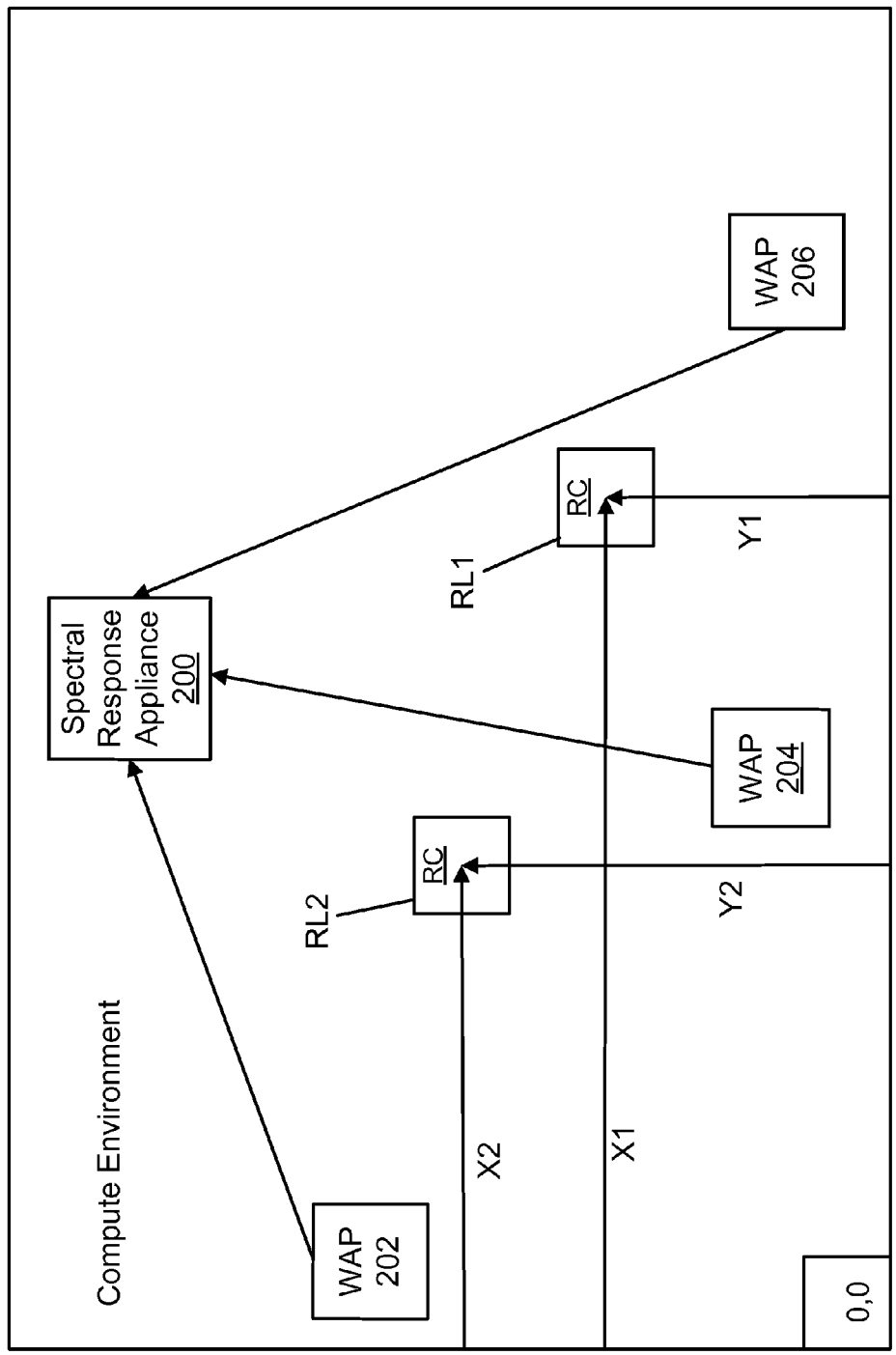
FIG. 4 is a schematic illustration of a spectral response appliance, according to an embodiment, a wireless device and multiple wireless access point devices disposed within a compute environment.

FIGS. 4-8 illustrate an example embodiment of a spectral response appliance. A spectral response appliance 200 can be configured the same or similar to, and function the same as or similar to, the appliance 100 described above. The spectral response appliance 200 (also referred to herein as "appliance") can be operatively coupled to and communicate with one or more WAP devices as described above. For example as shown in FIG. 4, the appliance 200 can be coupled to and communicate with a WAP device 202, a WAP device 204 and a WAP device 206 disposed within a compute environment. The WAP devices 202, 204 and 206 can each be configured the same or similar to and function the same as or similar to the WAP devices 102, 104, 106 described above. The compute environment can be a large space that lacks or has relatively few interior barriers such as, for example, a warehouse or large conference center or room.

FIGS. 4-7 illustrate the process of defining a predefined spectral response table as discussed above for appliance 100. As shown in FIG. 4, a reference compute device RC can be used to generate the predefined spectral response table. The reference compute device RC can be moved within the compute environment to various reference locations within the compute environment, and at each of the various reference locations the reference compute device RC can send signals to WAP device 202, WAP device 204 or WAP device 206, depending on the particular reference location of the reference compute device RC and its proximity to the various WAP devices. For example, as shown in FIG. 4, the reference compute device RC can be moved to a first reference location RL1 and to a second reference location RL2 (and other reference locations not shown in FIG. 4). The WAP device (e.g., 202, 204 and/or 206) can communicate or send frequency-domain data associated with the reference compute device RC to the appliance 200 at each of the reference locations. For example, the appliance 200 can receive the frequency domain data output from a FFT integrated circuit of the WAP device (e.g., 202, 204 and/or 206), as described above for appliance 100. The frequency-domain data can include frequency-selective fading data as described above, and the appliance 200 can use the frequency-domain data to determine a location of the reference compute device RC at each of the various locations (e.g., RL1 and RL2) within the compute environment.

More specifically, the appliance 200 can determine a spectral response deviation associated with each of the multiple different locations of the reference compute device RC based on frequency-domain data received from the WAP devices 202, 204, 206 (as described above) when the reference compute device RC is located at the multiple different locations within the compute environment. For example, when the reference compute device RC is disposed at the first reference location RF1, frequency-domain data associated with signals received at the WAP device 202, 204 and/or 206 from the reference compute device RC during a time period can be received at a magnitude generator module (not shown) of the appliance 200. The magnitude generator module can determine multiple frequency-domain magnitudes associated with the frequency-domain data for the time period.

Figure 5:
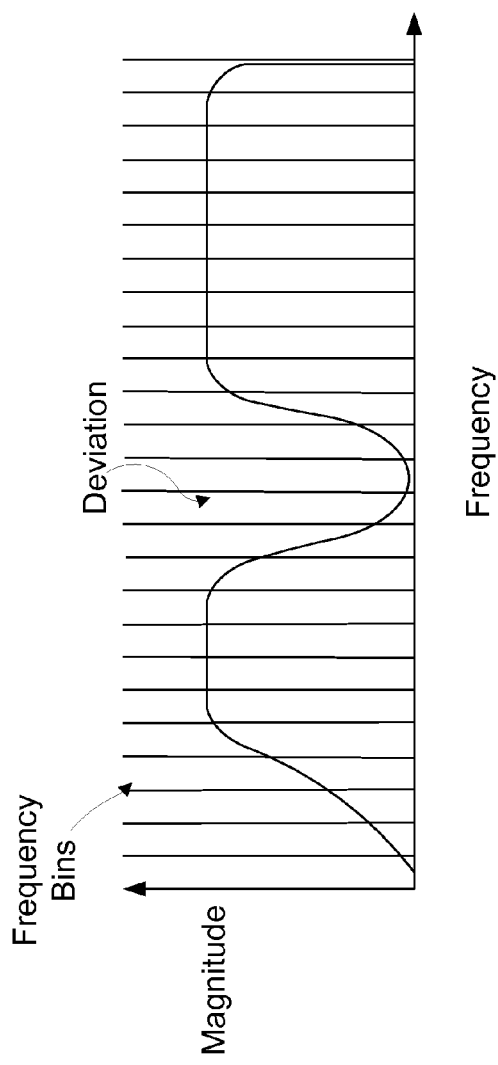
FIGS. 5 and 6 are each an example graph of different embodiments of a spectral response signature.

An accumulator module (not shown) of the appliance 200 can then generate a spectral magnitude signature associated with the frequency-domain data based on the multiple frequency-domain magnitudes. For example, the accumulator module can generate a table (not shown) representative of the spectral response signature. The spectral response signature can also be illustrated in a graph of the frequency-domain magnitudes. For example, FIG. 5 illustrates an example graph of magnitude versus frequency associated with the frequency-domain data associated with the signals received at a WAP 202, 204 and/or 206 from the reference compute device RC when the reference compute device RC is disposed at reference location RL1. Similarly, FIG. 6 illustrates an example graph of magnitude versus frequency associated with the frequency-domain data associated with the signals received at a WAP 202, 204 and/or 206 from the reference compute device RC when the reference compute device RC is disposed at reference location RL2.

Figure 6:
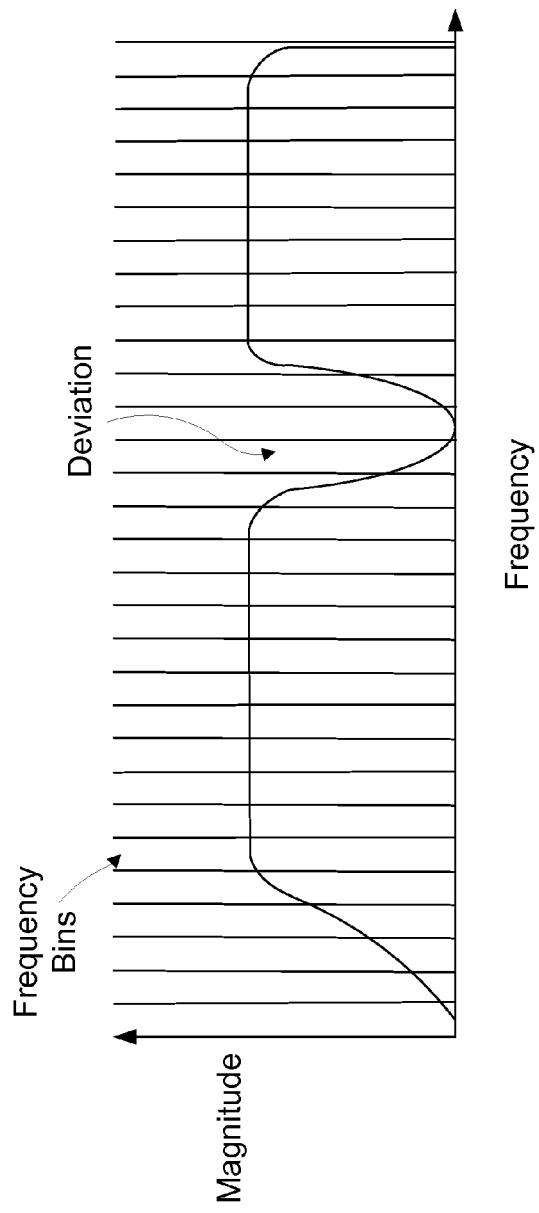

As shown in FIGS. 5 and 6, each frequency-domain magnitude can be uniquely associated with a frequency bin from multiple mutually-exclusive frequency bins associated with the frequency-domain data received from the WAP device 202, 204, 206 for a given time period in which the reference compute device RC is disposed at a particular location (e.g., RL1, RL2). The tables corresponding to FIGS. 5 and 6 generated by the accumulator module can be stored in the memory (not shown) of the appliance 200 and can include a frequency indicator associated with each of the frequency bins from the multiple mutually-exclusive frequency bins and a magnitude value associated with each frequency indicator from the multiple frequency indicators.

As illustrated in FIGS. 5 and 6, the frequency-domain magnitudes associated with the frequency-domain data are typically substantially equal for a given frequency by the time the frequency-domain data has been entirely received. Where the magnitude deviates from the substantially equal spectral magnitudes, the presence of frequency-selective fading is indicated and can be used to identify a spectral response deviation associated with the frequency-domain data. A spectral response module (not shown) of the appliance 200 includes a spectral feature extractor that can output numeric values that represent the location and depth of the spectral response deviations to generate a predefined spectral response table 240 shown in FIG. 7.

The predefined spectral response table 240 includes values S1-S6 associated with the spectral response deviations identified from the spectral response signature, and a location indicator associated with the each of the spectral response deviation. For example, the location indicator in this example includes an x-coordinate and a y-coordinate associated with a location grid defined by the compute environment. Referring back to FIG. 4, in this example, when the reference compute device RC is disposed at reference location RL1, the associated x-y coordinates within the location grid of the compute environment are X1, Y1 and the associated spectral response deviation is S1. When the reference compute device RC is disposed at reference location RL2, the associated x-y coordinates within the location grid of the compute environment are X2, Y2 and the associated spectral response deviation is S2. Other location indicators (X3, Y3; X4, Y4; X5, Y5; X6, Y6) associated with spectral response deviations S3-S6, respectively, are shown in the spectral response table 240, but not shown in FIG. 4.

Figure 8:
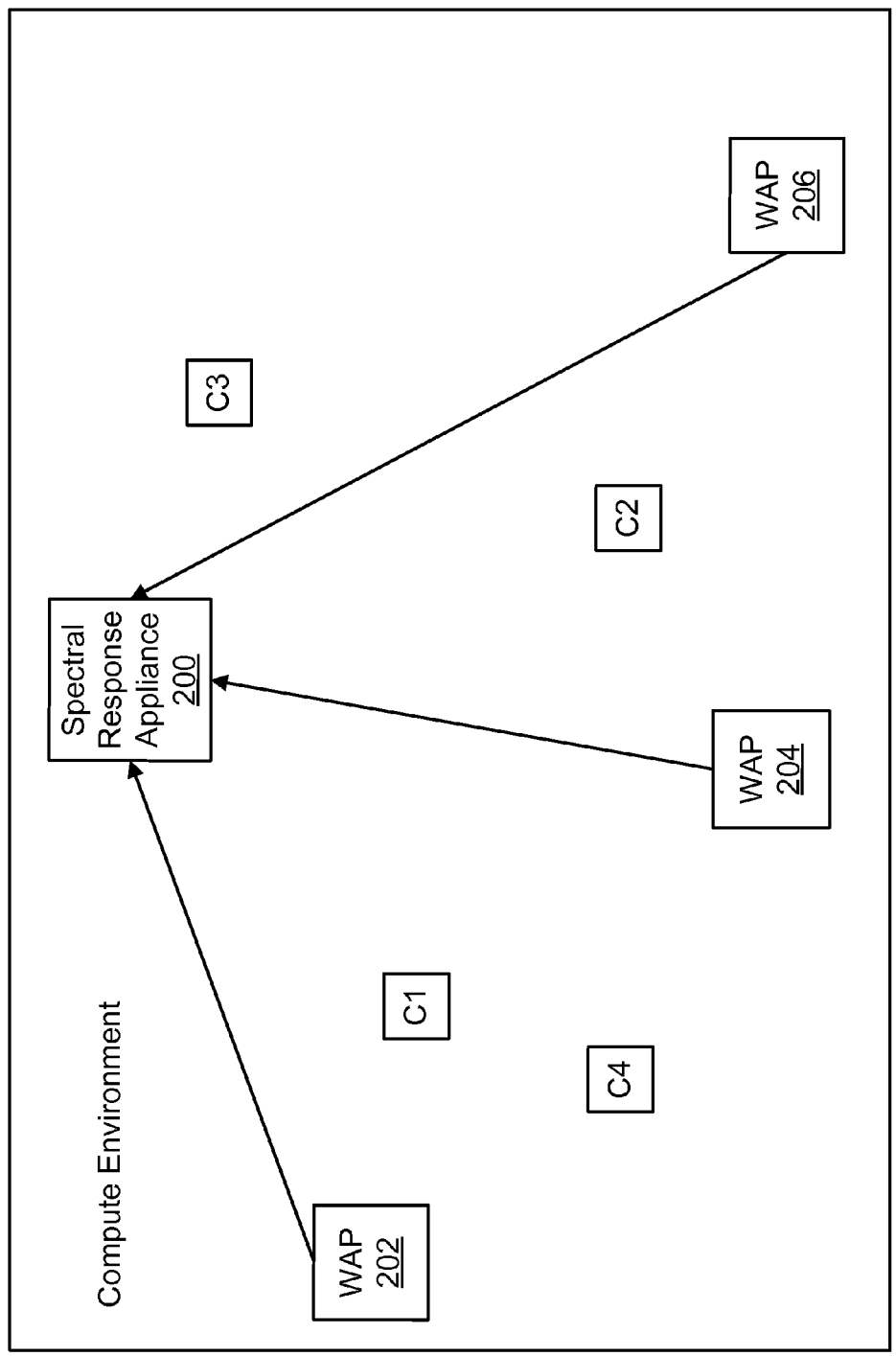
FIG. 8 is a schematic illustration of the spectral response appliance and wireless access point devices of FIG. 4 and multiple compute devices within the compute environment of FIG. 4.

After generating the predefined spectral response table 240, when a compute device, such as compute devices C1-C4, shown in FIG. 8, are subsequently moved within the compute environment, the appliance 200 can use the frequency-domain data received from the WAP devices 102, 104, 106 to determine a spectral response deviation for a given compute device at a given time period. The appliance 200 can then use the predefined spectral response table to determine the location of the compute device based on the identified spectral response deviation for that compute device. For example, for compute device C2, the appliance 200 can identify a spectral response deviation based on the frequency domain data received from the WAP device (e.g., 202, 204, 206) from the compute device C2 as previously described. In this example, if the spectral response deviation associated with compute device C2 is determined to be S4, the spectral response module of the appliance 200 can use the predefined spectral response table 240 to identify the location identifier (e.g., x, y coordinates) associated with the location of the compute device C2 within the compute environment. In this example, the location identifier includes x-coordinate, X4, and y-coordinate, Y4, within the location grid of the compute environment. Thus, the appliance 200 can identify the location of a compute device (e.g., C1-C4) within the compute environment at a given time period.

Figure 9:
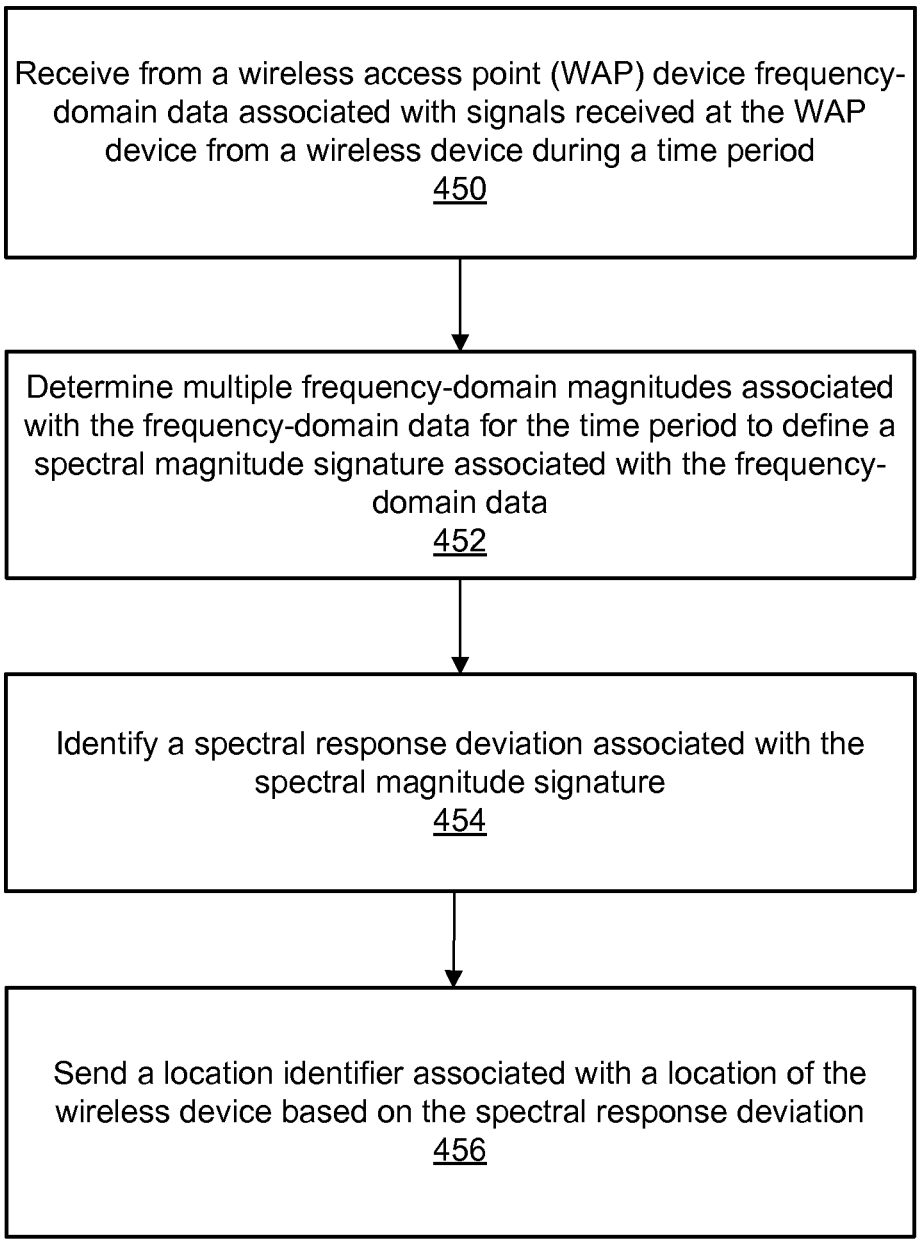
FIG. 9 is a flowchart illustrating a method of determining a location of a wireless device within a compute environment, according to an embodiment.

FIG. 9 is a flowchart illustrating a method of determining a location of a wireless device within a compute environment, according to an embodiment. The method includes at 450, receiving from a wireless access point (WAP) device, frequency-domain data associated with signals received at the WAP device from a wireless device during a time period. At 452, multiple frequency-domain magnitudes associated with the frequency-domain data for the time period are determined to define a spectral magnitude signature associated with the frequency-domain data. Each frequency-domain magnitude from the multiple frequency-domain magnitudes can be uniquely associated with a frequency bin from multiple mutually-exclusive frequency bins associated with the frequency domain data. At 454, a spectral response deviation associated with the spectral magnitude signature can be identified.

At 456, based on the spectral response deviation, a location identifier associated with a location of the wireless device can be sent to the WAP device or to a user of the spectral response appliance. For example, a location identifier can be associated with a location grid defined by a compute environment in which the wireless device is disposed. In some embodiments, the location identifier can include an x-coordinate and a y-coordinate associated with the location grid defined by the compute environment.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
   receive from a wireless access point (WAP) device frequency-domain data associated with signals received at the WAP device from a wireless device during a time period;
   determine a plurality of frequency-domain magnitudes associated with the frequency-domain data for the time period to define a spectral magnitude signature associated with the frequency-domain data, each frequency-domain magnitude from the plurality of frequency-domain magnitudes being uniquely associated with a frequency bin from a plurality of mutually-exclusive frequency bins associated with the frequency domain data;
   identify a spectral response deviation associated with the spectral magnitude signature; and
   send a location identifier associated with a location of the wireless device based on the spectral response deviation.

2. The non-transitory processor-readable medium of claim 1, wherein the location identifier is associated with a location grid defined by a compute environment in which the wireless device is disposed.

3. The non-transitory processor-readable medium of claim 1, wherein the location identifier includes an x-coordinate and a y-coordinate associated with a location grid defined by a compute environment in which the wireless device is disposed.

4. The non-transitory processor-readable medium of claim 1, wherein the code to define the spectral magnitude signature associated with the frequency-domain data includes code to store a frequency indicator associated with each of the frequency bins from the plurality of mutually-exclusive frequency bins and a magnitude value associated with each frequency indicator from the plurality of frequency indicators.

5. The non-transitory processor-readable medium of claim 1, wherein the code to receive from the WAP device frequency-domain data includes code to receive data output from a fast Fourier transfer (FFT) integrated circuit of the WAP device.

6. The non-transitory processor-readable medium of claim 1, further comprising code to:
   generate a predefined spectral response table including a plurality of reference spectral response deviations and a plurality of location identifiers, each reference spectral response deviation from the plurality of reference spectral response deviations associated with a location identifier from the plurality of location identifiers; and
   prior to the sending the location identifier associated with the location of the wireless device, identify the location identifier associated with the location of the wireless device based on the spectral response table and the spectral response deviation.

7. The non-transitory processor-readable medium of claim 1, further comprising code to:
   generate a predefined spectral response table including a plurality of reference spectral response deviations and a plurality of location identifiers, each reference spectral response deviation from the plurality of reference spectral response deviations associated with a location identifier from the plurality of location identifiers, the plurality of location identifiers including an x-coordinate and a y-coordinate associated with a location grid defined by a compute environment in which the wireless device is disposed; and
   prior to the sending the location identifier associated with the location of the wireless device, identify the location identifier associated with the location of the wireless device based on the spectral response table and the spectral response deviation.

8. An apparatus, comprising:
   a spectral response appliance configured to be coupled to a wireless access point (WAP) device that receives from a wireless device signals during a time period, the spectral response appliance configured to receive from a fast Fourier transfer (FFT) integrated circuit of the WAP device frequency-domain data associated with the signals received by the WAP device from the wireless device,
   the spectral response appliance including a spectral response module configured to identify a spectral response deviation associated with the frequency-domain data received from the FFT integrated circuit and send an indicator based on the spectral response deviation.

9. The apparatus of claim 8, wherein the indicator includes a location identifier associated with a location of the wireless device.

10. The apparatus of claim 8, wherein the indicator includes a location identifier associated with a location of the wireless device, the location identifier being associated with a location grid defined by a compute environment in which the wireless device is disposed.

11. The apparatus of claim 8, wherein the indicator includes a location identifier associated with a location of the wireless device, the location identifier including an x-coordinate and a y-coordinate associated with a location grid defined by a compute environment in which the wireless device is disposed.

12. The apparatus of claim 8, wherein the spectral response appliance includes a magnitude generator module configured to determine a plurality of frequency-domain magnitudes associated with the frequency-domain data for the time period, each frequency-domain magnitude from the plurality of frequency-domain magnitudes being uniquely associated with a frequency bin from a plurality of mutually-exclusive frequency bins associated with the frequency-domain data.

13. The apparatus of claim 8, wherein the spectral response appliance includes a magnitude generator and an accumulator module, the magnitude generator module configured to determine a plurality of frequency-domain magnitudes associated with the frequency-domain data for the time period, each frequency-domain magnitude from the plurality of frequency-domain magnitudes being uniquely associated with a frequency bin from a plurality of mutually-exclusive frequency bins associated with the frequency-domain data, the accumulator module configured to generate a spectral magnitude signature associated with the frequency-domain based on the plurality of frequency-domain magnitudes, the spectral response module configured to identify the spectral response deviation based on the spectral magnitude signature.

14. The apparatus of claim 8, wherein the spectral response module is configured to generate a predefine spectral response table including a plurality of reference spectral response deviations and a plurality of location identifiers, each reference spectral response deviation from the plurality of reference spectral response deviations associated with a location identifier from the plurality of location identifiers.

15. The apparatus of claim 8, wherein the spectral response module is configured to generate a predefined spectral response table including a plurality of reference spectral response deviations and a plurality of location identifiers, each reference spectral response deviation from the plurality of reference spectral response deviations associated with a location identifier from the plurality of location identifiers, the plurality of location identifiers including an x-coordinate and a y-coordinate associated with a location grid defined by a compute environment in which the wireless device is disposed.

16. An apparatus, comprising:

a spectral response appliance configured to be coupled to a wireless access point (WAP) device that receives frequency-domain data associated with signals from a wireless device during a time period, the spectral response appliance configured to determine a plurality of frequency-domain magnitudes associated with the frequency-domain data for the time period to define a spectral magnitude signature associated with the frequency-domain data, the spectral response appliance configured to identify a spectral response deviation associated with the spectral magnitude signature, the spectral response appliance configured to send a location identifier associated with a location of the wireless device based on the spectral response deviation.

17. The apparatus of claim 16, wherein the location identifier is associated with a location grid defined by a compute environment in which the wireless device is disposed.

18. The apparatus of claim 16, wherein:

each frequency-domain magnitude from the plurality of frequency-domain magnitudes is uniquely associated with a frequency bin from a plurality of mutually-exclusive frequency bins associated with the frequency domain data, the spectral response appliance is configured to store a frequency indicator associated with each of the frequency bins from the plurality of mutually-exclusive frequency bins and a magnitude value associated with each frequency indicator from the plurality of frequency indicators, the spectral response appliance is configured to identify a spectral response deviation associated with the spectral magnitude signature based on the frequency indicator for each frequency bins from the plurality of mutually-exclusive frequency bines and the magnitude value associated with each frequency indicator from the plurality of frequency indicators.

19. The apparatus of claim 16, wherein the spectral response appliance is configured to receive frequency-domain data output from a fast Fourier transfer (FFT) integrated circuit of the WAP device.

20. The apparatus of claim 16, wherein:

the spectral response appliance is configured to generate a predefined spectral response table including a plurality of reference spectral response deviations and a plurality of location identifiers, each reference spectral response deviation from the plurality of reference spectral response deviations associated with a location identifier from the plurality of location identifiers; and the spectral response appliance is configured to identity, prior to sending the location identifier associated with the location of the wireless device, the location identifier associated with the location of the wireless device based on the spectral response table and the spectral response deviation.

* * * * *